(12) United States Patent
Reed et al.

(10) Patent No.: US 7,416,258 B2
(45) Date of Patent: Aug. 26, 2008

(54) METHODS OF USING A LASER TO SPALL AND DRILL HOLES IN ROCKS

(75) Inventors: Claude B. Reed, Bolingbrook, IL (US); Zhiyue Xu, Naperville, IL (US); Richard A. Parker, Arvada, CO (US); Ramona M. Graves, Evergreen, CO (US); Thomas W. Stone, Hellertown, PA (US)

(73) Assignee: Uchicago Argonne, LLC, Chicago, IL (US)

( * ) Notice: Subject to any disclaimer, the term of this patent is extended or adjusted under 35 U.S.C. 154(b) by 280 days.

(21) Appl. No.: 11/404,698

(22) Filed: Apr. 14, 2006

(65) Prior Publication Data

US 2006/0237233 A1    Oct. 26, 2006

Related U.S. Application Data

(60) Provisional application No. 60/672,769, filed on Apr. 19, 2005.

(51) Int. Cl.
*E21B 7/14* (2006.01)
*E21B 7/15* (2006.01)
*E21C 37/16* (2006.01)
*E21C 35/24* (2006.01)

(52) U.S. Cl. .......................... 299/14; 299/1.05; 299/95; 175/57; 175/19

(58) Field of Classification Search .................. 175/19, 175/57; 299/1.05, 14, 95
See application file for complete search history.

(56) References Cited

U.S. PATENT DOCUMENTS

| 3,871,485 | A | * | 3/1975 | Keenan, Jr. | .................. | 175/16 |
| 4,090,572 | A | * | 5/1978 | Welch | .................. | 175/16 |
| 6,755,262 | B2 | * | 6/2004 | Parker | .................. | 175/57 |
| 6,857,706 | B2 | * | 2/2005 | Hames et al. | .................. | 299/18 |

* cited by examiner

*Primary Examiner*—Shane Bomar
(74) *Attorney, Agent, or Firm*—Joan Pennington

(57) ABSTRACT

Apparatus and methods of using lasers are provided for spalling and drilling holes into rocks. A rock removal process is provided that utilizes a combination of laser-induced thermal stress and laser induced superheated steam explosions just below the surface of the laser/rock interaction to spall the rock into small fragments that can then be easily removed by a purging flow. Single laser beams of given irradiance spall rock and create holes having diameter and depth approximately equal to the beam spot size. A group of the single laser beams are steered in a controllable manner by an electro-optic laser beam switch to locations on the surface of the rock, creating multiple overlapping spalled holes thereby removing a layer of rock of a desired diameter. Drilling of a deep hole is achieved by spalling consecutive layers with an intermittent feed motion of the laser head perpendicular to the rock surface.

11 Claims, 1 Drawing Sheet

METHODS OF USING A LASER TO SPALL AND DRILL HOLES IN ROCKS

This application claims the benefit of U.S. Provisional Application No. 60/672,769, filed on Apr. 19, 2005.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to improved methods and apparatus for spalling and drilling holes into rock formations. More specifically this invention relates the use of lasers for spalling and drilling holes into rock formations.

DESCRIPTION OF THE RELATED ART

A conventional rotary drilling method for drilling gas and oil wells is the use of a drill bit on the end of a long length of drill pipe also called a drill string that is rotated by mechanical apparatus from the surface. The drill bit that actually cuts up the rock comes in many shapes and materials, such as tungsten carbide, steel, diamond, that are specialized for various drilling tasks and rock formations. Drill bits are often worn out or broken down during a deep well drilling. Each bit replacement requires drill string removal from the deep well section by section. To keep a drilled hole from collapsing, a steel casing needs to be installed and cemented to the well bore. All of these dramatically increase the well drilling time, and therefore the well drilling costs. Major reduction in drilling costs can be achieved by drilling faster and reducing requirements for drill string removal, bit replacement and setting casing.

High power laser beams have been demonstrated to be effective in drilling rocks. The rate of penetration on rock by kilowatt-level lasers was reported many times faster than current rates using mechanical drill bits. This saves well drilling time and costs. High power laser beams can remove rock by vaporization, melting, and spallation. Test data show that laser spallation rock removal is the most energy efficient. Laser spallation is a rock removal process that utilizes a combination of laser-induced thermal stress and laser induced superheated steam explosions just below the surface of the laser/rock interaction to spall or fracture the rock into small fragments that can then be easily removed from the rock formation. High intensity laser energy, applied on a rock that normally has very low thermal conductivity, concentrates locally on the rock surface area and causes the local temperature to increase instantaneously. This results in local thermal stresses in the rock subsurface. The laser energy also instantaneously vaporizes the moisture or liquid in the subsurface. The explosion of the vaporized liquid creates significant mechanical stresses in the rock. These laser-induced thermal and mechanical stresses spall the rock. The advantages of the laser spallation rock removal are three-fold: (1) rock is removed by spallation, so it is most energy efficient, (2) the process is beam fiber-optical cable deliverable due to low required laser power for each spalling beam, and (3) small rock debris or fragments are readily flushed out by standard well flushing methods.

U.S. Pat. No. 6,755,262 B2 to Parker, issued Jun. 29, 2004 discloses an earth boring apparatus at least partially locatable within a borehole that includes a plurality of optical fibers, each of which has a proximal fiber light energy input end and a distal fiber light energy output end. At least one focal lens is disposed at the distal fiber light energy output end. The focal lens is made up of a plurality of focal elements, each of which corresponds to the distal fiber light energy output end of at least one optical fiber. The focal lens is arranged to receive light energy from the corresponding distal fiber light energy output end of the at least one optical fiber and focus it outwardly from the distal fiber light energy output end.

Principal objects of the present invention are to provide methods and apparatus of using lasers for spalling and drilling holes into rock formations.

Other important objects of the present invention are to provide such methods of using lasers for spalling and drilling holes into rock formations substantially without negative effect and that overcome some of the disadvantages of prior art arrangements.

SUMMARY OF THE INVENTION

In brief, apparatus and methods of using lasers are provided for spalling and drilling holes into rock formations.

In accordance with features of the invention, a rock destruction process is provided that utilizes a combination of laser-induced thermal stress and laser induced superheated steam explosions just below the surface of the laser/rock interaction to spall or fracture the rock into small fragments that can then be easily removed from the rock formation. The use of high power laser beams of kilowatt level is provided to rapidly drill large diameter and deep holes in rocks.

In accordance with features of the invention, short illumination by a single laser beam of irradiance about 1000 to 5000 $W/cm^2$ spalls rock and creates a hole as large as the beam spot size and approximately as deep as the hole diameter. A group of the single laser beams are steered in a controllable manner by an electro-optic high power laser beam switch to locations on the target surface of the rock, which creates multiple overlapping spalled holes to remove a layer of nearly circular work face of a desired diameter. The rock fragments from this layer will be instantaneously removed with the help of a purging and flushing system. Three dimensional removal of rock is achieved by spalling consecutive layers with an intermittent feed motion of laser head perpendicular to the freshly drilled surface of rock. Layer by layer, a deep hole will be drilled until the designed depth is reached.

Apparatus and a high power laser are provided for delivering a high power laser beam to the target surface of the rock downhole. The laser beam, that is delivered to a laser beam switch by a fiber optic cable, is shaped to the desired beam profile by optics before being steered in a controllable manner by the electro-optic beam switch to predefined locations on the surface of rock. A purging flow is provided to remove the spalled rock fragments from the hole and to create a clear path through wellbore liquid for the beam to reach the rock while drilling.

In accordance with features of the invention, the beam shaping lens, beam switch, and purging package are housed in a laser head that provides necessary protection to the parts inside and up-and-down motion for all parts together. The beam irradiance and duration of illumination are set up at such values that the laser removes rock by laser spallation, which is most energy efficient.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
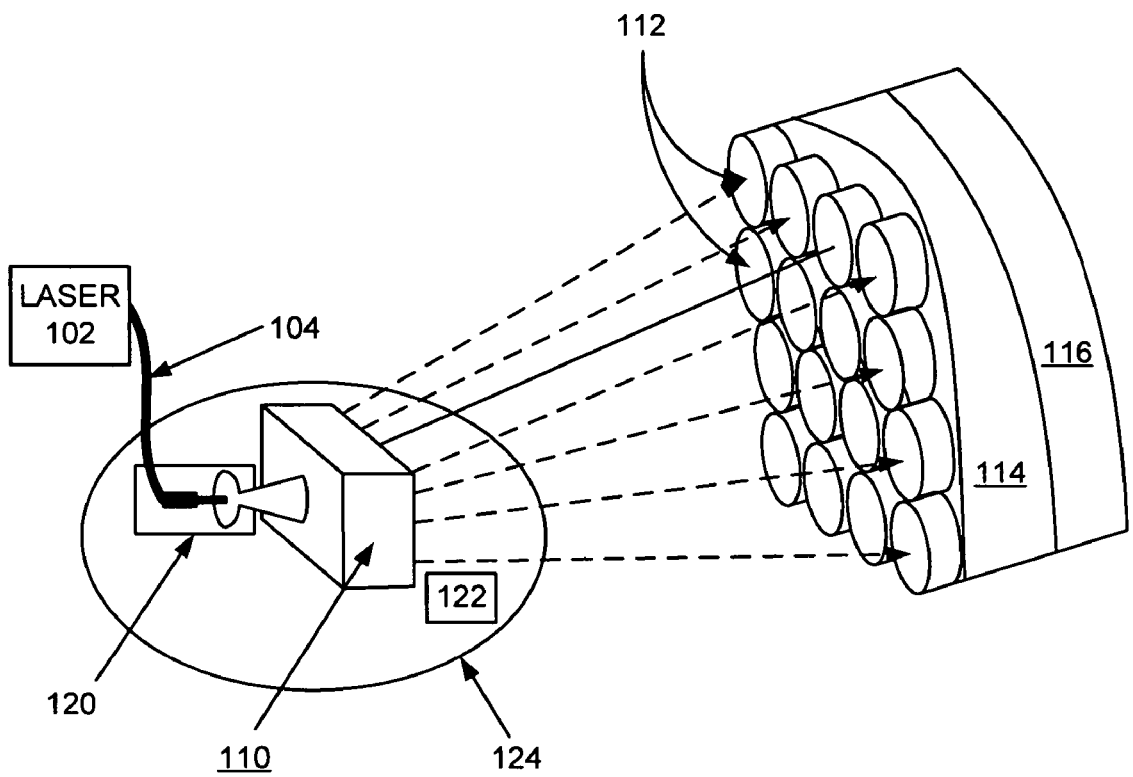
FIG. 1 is a schematic diagram illustrating apparatus for steering a single laser beam to drill a large, deep hole for implementing methods of the invention in accordance with a preferred embodiment of the invention.

In accordance with features of the invention, a rock destruction process utilizes a combination of laser-induced thermal stress and laser induced superheated steam explosions just below the surface of the laser/rock interaction to spall or fracture the rock into small fragments that can then be easily removed from the rock formation. The method of the invention uses high power laser beams of kilowatt level to replace conventional mechanical drilling bits to rapidly drill large diameter and deep holes in rocks. It has been shown that short illumination of a single laser beam of irradiance about 1000 to 5000 W/cm$^2$ can thermally spall rock and create a hole as large as the beam spot size and as deep as the hole diameter.

Having reference now to the drawings, in FIG. 1 there is shown apparatus generally designated by the reference character 100 for implementing methods of the invention in accordance with a preferred embodiment of the invention. Apparatus 100 includes a high power pulsed laser 102 for generating a laser beam with a fiber-optic cable 104 used for delivering the high power laser beam 104 to an electro-optic high power laser beam switch 110.

As shown in FIG. 1, a single laser beam is steered in a controllable manner by the electro-optic high power laser beam switch 110 to predefined locations indicated by 112 on the target surface of the rock creating multiple overlapping spalled holes on the surface illuminated by the beam. Thus, a large diameter layer of rock that is as deep as the diameter of a single spalled hole can be removed by sequentially overlapping multiple laser spalled holes. Three-dimensional removal of rock is achieved by spalling consecutive layers 114, 116 with an intermittent feed motion of a laser head 124 perpendicular to the freshly drilled surface of the rock. The beam switch 110 steers the laser beam in a predefined pattern so that a nearly circular work face is created. The number of spalled holes at locations 112 that are needed depends on the laser power and the diameter of the hole to be drilled. Each full sequence of beam illumination for removing a layer of rock takes place within seconds. Layer by layer, a hole as deep as several thousand meters can be drilled, for example for drilling oil and gas wells.

Apparatus 100 includes a beam shaping optics package 120 for focusing and orienting the laser beam, a purging flow package or purging and flushing system indicated by 122 to remove spalled rock fragments and to create a clear beam path while lasing through liquid and dust, beam switch 110 to steer the beam in a controllable manner to the predefined locations on the surface of rock to remove a layer of rock of a desired diameter and the laser head 124 or enclosure to contain and provide protective housing for the electro-optic high power laser beam switch 110, the beam shaping optics package 120, and the purging flow package 122.

Unlike a mechanical laser beam switch that relies on mechanical motions to steer laser beams, the electro-optic high power laser beam switch 110 does not utilize any mechanical motions to steer laser beams, thereby increasing reliability and life time of the switch 110.

It is expected that the use of the invention would provide a major reduction in drilling costs in that the use of a laser would permit faster drilling by laser spallation of the rock and also reduce requirements for drill string removal and drill bit replacement.

Tests of changing specific power (power per unit area, $P_c$, kW/cm$^2$) along the linear laser track on rock slabs showed that a laser beam vaporized, melted, and spalled the rock as $P_c$ decreased from $1\times10^6$ W/cm$^2$ to $1\times10^3$ W/cm$^2$. The test also showed most rock volume removed was in the spallation range. Because the temperature of vaporization or fusion is usually much higher than that necessary to cause spallation, and because latent heat is absorbed in vaporization or fusion, spallation is the most efficient of the three mechanisms. The minimum specific energies (energy required to remove a unit volume of rock, SE, kJ/cm$^3$) for two typical reservoir rocks tested in this study are listed in Table 1. As one can see, rock removal mechanisms changed between spalling and melting by controlling either the specific power or exposure time and the "spalling only" mechanism required smaller specific energy. It is also shown in the table that pulsed Nd:YAG laser with ¼ of $CO_2$ laser average power could provide 2.5 times higher specific power. Lower average laser power kept rock removal in the spalling range. Firing the laser beam at the same spot for too long, as shown in Table 2 for shale from 0.5-second exposure time to 1.0 second, melted the rock and increased the specific energy. This implies that some relaxation time between laser bursts is needed to avoid melting. Shale data for the "spalling only" range shows that increase of specific power decreases the specific energy for spallation. This result provides a guideline for selection of laser power and laser beam spot size for the most efficient spallation rock removal, that is maximum specific power ought be used for laser rock removal provided that spallation precedes melting. In oil well rock drilling, rate of penetration (ROP) is an important variable used for evaluation of different drilling devices. ROP is related to specific power and specific energy by $$ROP = \frac{P_c}{SE}(cm/s)$$

To increase ROP of rock breaking, one should use techniques that have high specific power and low specific energy. The ROP for laser spalling operation was determined by using the highest specific power of 4217 W/cm$^2$ and the resultant specific energy of 0.52 kJ/cm$^3$ from shale data in Table 2. Laser spallation shows 8-100 times faster ROP than that of the conventional rock breaking techniques because it has specific power as high as that of flame jets, which is the highest among the conventional methods, and specific energy as low as that of most conventional methods.

TABLE 1

Conditions and results of laser rock removal

| Rock type | Laser used | Beam spot size, mm | Average power W | Specific power, W/cm$^2$ | Exposure time, s | Specific Energy, kJ/cm$^3$ |
|---|---|---|---|---|---|---|
| Berea Gray sand stone | cw CO2 | 19 | 2020 | 712 | 0.5 | 2.6 (Spalling) |
|  |  | 19 | 2210 | 780 |  | 3.5 (spalling + slight melting |
|  |  | 12.7 | 2210 | 1,745 |  | 6.5 (spalling + medium melting) |
|  |  | 12.7 | 3000 | 2,369 |  | 30.0 (heavy melting) |

TABLE 1-continued

Conditions and results of laser rock removal

| Rock type | Laser used | Beam spot size, mm | Average power W | Specific power, W/cm² | Exposure time, s | Specific Energy, kJ/cm³ |
|---|---|---|---|---|---|---|
| Shale | Pulsed Nd:YAG | 12.5 | 534 | 4,217 | 0.5 | 0.52 (spalling) |
|  |  |  | 415 | 3,280 |  | 1.79 (spalling) |
|  |  |  | 330 | 2,610 |  | 2.71 (spalling) |
|  |  |  | 262 | 2,070 |  | 3.53 (spalling) |
|  |  |  | 202 | 1,590 |  | 5.54 (spalling) |
|  |  |  | 534 | 4,217 | 1.0 | 3.6 (medium melting) |

While the present invention has been described with reference to the details of the embodiments of the invention shown in the drawing, these details are not intended to limit the scope of the invention as claimed in the appended claims.

What is claimed is:

1. A method for spalling and drilling holes into rock formations comprising the steps of:
   providing a short illumination of a unitary laser beam for spalling the rock formation to create a hole about as large as the beam spot size and about as deep as the hole diameter;
   steering the unitary laser beam in a controllable pattern using an electro-optic high power laser beam switch to a plurality of locations on a target surface of the rock formation to create multiple spalled holes on the target surface illuminated by the unitary laser beam; and
   removing spalled rock fragments using a purging and flushing system, and
   creating a clear beam path for the unitary laser beam with said purging and flushing system.

2. A method for spalling and drilling holes into rock formations as recited in claim 1 wherein steering the unitary laser beam includes creating multiple overlapping spalled holes on the target surface to remove a layer of rock of a desired diameter.

3. A method for spalling and drilling holes into rock formations as recited in claim 1 wherein steering the unitary laser beam further includes providing an intermittent feed motion of a laser head perpendicular to spalled holes on the target surface to spall consecutive layers of rock for deep hole drilling.

4. A method for spalling and drilling holes into rock formations as recited in claim 1 wherein the unitary laser beam has an irradiance in the range between 1000 W/cm² and 5000 W/cm².

5. A method for spalling and drilling holes into rock formations as recited in claim 1 wherein the step of steering the unitary laser beam in said controllable pattern by said electro-optic high power laser beam switch to said plurality of locations on said target surface of the rock formation to create multiple spalled holes on the target surface illuminated by the unitary laser beam includes the steps of sequentially overlapping multiple laser spalled holes to remove a large diameter layer of rock that is as deep as the diameter of a single spalled hole.

6. A method for spalling and drilling holes into rock formations as recited in claim 1 wherein the step of steering the unitary laser beam in said controllable pattern by said electro-optic high power laser beam switch to said plurality of locations on said target surface of the rock formation to create multiple spalled holes on the target surface illuminated by the unitary laser beam includes the steps of sequentially overlapping multiple laser spalled holes at an overlapping rate in the range between 2 and 10%.

7. A method for spalling and drilling holes into rock formations as recited in claim 1 wherein the step of steering the unitary laser beam in a said controllable pattern by said electro-optic high power laser beam switch to said plurality of locations on said target surface of the rock formation to create multiple spalled holes on the target surface illuminated by the unitary laser beam includes the step of sequentially removing multiple rock layers by repeating the steering of the laser beam to create multiple spalled holes on the target surface illuminated by the unitary laser beam of each sequential layer.

8. A method for spalling and drilling holes into rock formations as recited in claim 1 wherein the step of providing said short illumination of said unitary laser beam includes the steps of providing a kilowatt level laser beam delivered by a single fiber optic cable.

9. Apparatus for spalling and drilling holes into rock formations comprising:
   a laser for generating a kilowatt level power unitary laser beam for spalling the rock formation to create a hole about as large as the beam spot size and about as deep as the hole diameter;
   a single fiber optic cable for delivering the kilowatt level power unitary laser beam to a target surface of a rock within a borehole;
   a beam shaping optics package for focusing and orienting the unitary laser beam;
   a purging flow to remove spalled rock fragments and to create a clear laser beam path while lasing through liquid and dust to the target surface; and
   an electro-optical laser beam switch for steering the unitary laser beam in a predefined pattern to create multiple spalled holes on the target surface illuminated by the unitary laser beam.

10. Apparatus for spalling and drilling holes into rock formations as recited in claim 9 wherein said electro-optical laser beam switch steers the unitary laser beam in the predefined pattern, eliminating mechanical motions.

11. Apparatus for spalling and drilling holes into rock formations as recited in claim 9 includes an enclosure for containing said electro-optical laser beam switch, and said beam shaping optics package.

\* \* \* \* \*